United States Patent
Christopher et al.

(10) Patent No.: US 10,279,290 B2
(45) Date of Patent: May 7, 2019

(54) APPARATUS AND METHOD FOR FILTRATION EFFICIENCY IMPROVEMENTS IN FIBROUS FILTER MEDIA

(71) Applicant: HDK Industries, Inc., Rogersville, TN (US)

(72) Inventors: David Bruce Christopher, Rogersville, TN (US); Christopher Bruce Peart, Kingsport, TN (US); Christopher A. Hagler, Monroe, NC (US)

(73) Assignee: HDK Industries, Inc., Rogersville, TN (US)

( * ) Notice: Subject to any disclaimer, the term of this patent is extended or adjusted under 35 U.S.C. 154(b) by 0 days.

(21) Appl. No.: 15/118,291

(22) PCT Filed: May 14, 2015

(86) PCT No.: PCT/US2015/030698
§ 371 (c)(1),
(2) Date: Aug. 11, 2016

(87) PCT Pub. No.: WO2016/025046
PCT Pub. Date: Feb. 18, 2016

(65) Prior Publication Data
US 2017/0173508 A1   Jun. 22, 2017

Related U.S. Application Data

(60) Provisional application No. 62/037,300, filed on Aug. 14, 2014.

(51) Int. Cl.
| | | |
|---|---|---|
| *B01D 39/00* | (2006.01) | |
| *B01D 39/16* | (2006.01) | |
| *D04H 1/4282* | (2012.01) | |
| *D04H 1/732* | (2012.01) | |
| *D06M 15/643* | (2006.01) | |
| *D06M 101/20* | (2006.01) | |
| *D06M 101/32* | (2006.01) | |

(52) U.S. Cl.
CPC ......... *B01D 39/163* (2013.01); *D04H 1/4282* (2013.01); *D04H 1/732* (2013.01); *D06M 15/643* (2013.01); *D06M 2101/20* (2013.01); *D06M 2101/32* (2013.01)

(58) Field of Classification Search
CPC .... B01D 39/163; D04H 1/732; D04H 1/4282; D06M 15/643; D06M 2101/20; D06M 2101/32
See application file for complete search history.

(56) References Cited

U.S. PATENT DOCUMENTS

| | | | |
|---|---|---|---|
| 3,317,367 A | 5/1967 | Koller | |
| 5,785,725 A | 7/1998 | Cusick et al. | |
| 5,800,586 A | 9/1998 | Cusick et al. | |
| 5,948,344 A | 9/1999 | Cusick et al. | |
| 5,993,501 A | 11/1999 | Cusick et al. | |
| 6,110,251 A | 8/2000 | Jackson et al. | |
| 6,261,335 B1 | 7/2001 | Kern et al. | |
| 6,444,312 B1 * | 9/2002 | Dugan | D01D 5/253 428/370 |
| 7,021,349 B2 * | 4/2006 | Klein | D06M 7/00 152/451 |
| 7,727,915 B2 | 6/2010 | Skirius et al. | |
| 8,057,583 B2 | 11/2011 | Grove, III et al. | |
| 2005/0160711 A1 | 7/2005 | Yang | |
| 2006/0277877 A1 | 12/2006 | Shields | |
| 2007/0271889 A1 | 11/2007 | Jaffee | |
| 2007/0271890 A1 | 11/2007 | Jaffee | |
| 2009/0012128 A1 | 1/2009 | Tsuchida et al. | |
| 2012/0234748 A1 * | 9/2012 | Little | D04H 1/435 210/488 |
| 2013/0008006 A1 | 1/2013 | Israiel et al. | |
| 2013/0327218 A1 * | 12/2013 | Izzi | B32B 5/022 95/281 |

* cited by examiner

*Primary Examiner* — Robert A Hopkins
(74) *Attorney, Agent, or Firm* — Nexsen Pruet, PLLC; E. Eric Mills

(57) ABSTRACT

A method for improving air filtration efficiency of a fibrous nonwoven media and a fibrous non-woven air filtration media having improved filtration efficiency. The method includes applying to fibrous material at least about 0.05 wt. % based on a total weight of the fibrous material of chemical treatment comprising an alkoxylated silicone copolymer. The chemical treatment is effective to provide an improvement in an E3 filtration efficiency value of the filtration media as tested according to ASHRAE 52.2 of about 20% or more compared to an E3 filtration efficiency value of fibrous material devoid of any chemical treatment.

17 Claims, No Drawings

APPARATUS AND METHOD FOR FILTRATION EFFICIENCY IMPROVEMENTS IN FIBROUS FILTER MEDIA

RELATED APPLICATION

This application claims priority to international application number PCT/US15/30698 filed May 14, 2015.

TECHNICAL FIELD

The disclosure relates to the field of fibrous nonwoven filter media. More particularly, the disclosure relates to systems that give improvements in filtration efficiency through chemical treatments applied to fibrous nonwoven media and the filters produced therefrom.

BACKGROUND AND SUMMARY

Fibrous materials have long been used in filter media to remove particulates from an air stream. Manufacturers of filter media have a multitude of variables to consider in choosing raw materials for their process in a specific media design. These include material properties such as polymer type, density, thickness, weight, moisture regain, and luster, as well as specific fiber characteristics such as crimp, tensile strength, crystallinity, diameter, cross-sectional shape, length, and finish.

The first step in preparing the filter media is converting the fibrous materials into a nonwoven. Nonwovens are fabric-like materials that can be made in dry laid processes by the direct melt spinning of fibrous materials collected into a web such as a spunbond process, or by processing short fiber lengths through fiber opening, blending, and consolidation into a fibrous web as in a carding process. Carding can be described as a mechanical process of individualizing and intermixing finite fibrous lengths to produce a continuous fibrous web. Once the fibrous web has been formed from carding, a secondary process of bonding is necessary to give the fibrous web integrity and strength. This bonding process may be accomplished through chemical, thermal or mechanical means.

During the carding process, fibrous materials are subjected to high stresses due to friction between fibers and metal surfaces as well as fiber-to-fiber. Desirable qualities during the carding operation include low fiber-to-metal friction, in order to reduce fiber damage, and simultaneous high fiber-to-fiber friction to promote better web cohesion, a necessary property to aid in downstream web processing and ultimate web strength. Static charges develop during carding from the transfer of electrons from one material type to another as they contact each other. This may cause the fibrous material to cling to the metal card surfaces or even repel each other, ending up in a non-uniform web of fibers having thick and thin spots. It is desirable to minimize static charges during carding in order to achieve good processing and good web uniformity necessary for producing filter media.

Carding of all fibers typically includes the use of a processing aid in order to minimize many of the aforementioned problems. The processing aid may be described as a complex, proprietary mixture of chemicals blended to specifically affect the undesired conditions mentioned above. This chemical blend is generally a well-kept trade secret for those who supply the individual ingredients as well as those who manufacture the chemical mix. This mix may include but is not limited to lubricants, emulsifiers, antistats, antimicrobial agents, cohesive agents, and wetting agents. Often the chemistry of the mix is formulated such that the components perform several different simultaneous functions.

The chemical mix used in carding of fibers is often referred to as a spin finish, and is typically applied by the fiber manufacturer. Application of the chemical mix may be performed in the melt spinning operation and is usually accomplished by a kiss roll or metered flow applicator, where typically an aqueous emulsion of the chemical mix is applied per unit weight of the fiber.

Although aqueous emulsions are desirably used in the chemical mix, other organic liquids such as alcohols or blends of organic liquids have been used. This solvent is typically removed from the chemical mix during later processing, while the primary components of the mix remain on the fibers to aid in fiber processing.

The chemical mix may also be added during the operations of drawing, crimping and cutting during manufacturing the fibrous materials. The foregoing operations ensure sufficient amount of the spin finish has been applied to the fibrous materials for processing into a fibrous nonwoven media. The spin finish level may be determined by typical extraction procedures.

Changes in spin finishes within a fiber manufacturer's facility are generally not desirable due to the down time required for cleaning and change overs, therefore it is a reasonable goal for a fiber supplier to limit the number of spin finishes within their manufacturing facility. The spin finish supplier and fiber producer rarely disclose the ingredients used in the chemical mix unless problems arise at the customer's facility like discoloration or in processing of the fibers such as carding. Even then specific details of formulations and exact chemical components are rarely fully disclosed.

Fibrous nonwoven media once produced from a carding process must then be converted to a filter. This may involve a pleating process depending upon filter design, where the media is folded upon itself to create pleats that serve to increase surface area within a given filter design. Heating may also be used in this process to aid in the folding process and setting the pleat. It is important to understand the effect that this process may have on the chemical finish that was applied in the carding process.

Nonwoven producers of fibrous filter media will use ASHRAE (American Society for Heating, Refrigerating and Air-Conditioning Engineers) Test Standard 52.2 to obtain data relating to the efficiency of the filter media. ASHRAE uses the MERV (Minimum Efficiency Rating Value) scale as a means of comparing initial efficiency ratings of various filter media. In general the higher the MERV value the higher the efficiency of the filter media. It is also common to compare efficiency values in groups depending upon particle sizes within the air stream during testing. E3, E2 and E1 values refer to particulate efficiency values at 3-10 microns, 1-3 microns and 0.3-1 microns respectively.

Until now, the art of improving the filtration efficiency of fibrous nonwoven filter media using chemical treatments has been to apply the chemical treatments to the media after the filter media has been formed. Examples include but are not limited to spraying, incorporation into the chemical binder, dipping, kiss coating, foaming and a number of other operations similar to those found in textile and a host of nonwoven operations for applying chemical treatments. Such methods add a level of complexity to the nonwoven process and often times require additional unit operations like drying to remove moisture added as a result of the treatment process.

Filtration media producers who produce filter media from fibrous materials in a carding operation have failed to consider the effect that the chemical treatment applied by the fiber producer may have on the efficiency of the media once converted into a filter. The spin finish, applied to the fibers during processing has generally been considered only as a processing aid in producing the nonwoven media. What is needed, therefore, is a method of application of chemical treatments for filter media that does not add additional complexity or additional processing steps.

In accordance with the foregoing, an embodiment of the disclosure provides a method for improving air filtration efficiency of a fibrous nonwoven media and a fibrous nonwoven air filtration media having improved filtration efficiency. The method includes applying to fibrous material at least about 0.05 wt. % based on a total weight of the fibrous material of chemical treatment comprising an alkoxylated silicone copolymer. The chemical treatment is effective to provide an improvement in an E3 filtration efficiency value of the filtration media as tested according to ASHRAE 52.2 of about 20% or more compared to an E3 filtration efficiency value of said fibrous material devoid of any chemical treatment In another embodiment, there is provided a fibrous nonwoven air filtration media comprising fibrous material that includes from about 0.1 to about 0.5 wt. % based on a total weight of the fibrous material of a chemical treatment. The chemical treatment includes an alkoxylated silicone copolymer, whereby the non-woven air filtration media has an improvement in an E3 filtration efficiency value as tested according to ASHRAE 52.2 of about 20% or more compared to an E3 filtration efficiency value of fibrous material devoid of any chemical treatment.

It has been found quite surprisingly that the chemical treatment applied by the fiber producer may be used difunctionally, both as a processing aid to reduce friction and stresses in the carding operation and as a treatment to improve the particle filtration efficiency of the filter produced from such a process. By incorporating certain chemical treatments, at certain treat rates as a spin finish during the staple fiber manufacturing process, the chemical treatment may act difunctionally to aid in processing during carding during the manufacturing of the fibrous nonwoven filter media as well as to provide improvements in the filtration efficiency of the filter media when tested per ASHRAE 52.2.

Although the method of using certain chemical treatments difunctionally as a spin finish and aid to increase filtration efficiency, chemical treatment may also be applied by traditional application methods to the nonwoven web itself to provide improvements to the filtration efficiency of a filter made from the treated nonwoven web.

DETAILED DESCRIPTION

As described in more detail herein, a chemical treatment is applied to the fibers of a nonwoven filter media that provide a filter media with an increase in filtration efficiency, as measured by E3 efficiencies using ASHRAE Test Standard 52.2. The components of a suitable chemical treatment may be selected from the group of one or more of a lubricant, an emulsifier, and an antistatic agent and are available from Goulston Technologies of Monroe, N.C.

According to embodiments of the disclosure, the nonwoven filtration media is comprised of polymeric fibers selected from mono- and bi-component (bico) fibers. The bico fibers are composed of side-by-side fibers or sheath/core structure with polyethylene or polypropylene as the sheath polymer and polyethylene terephthalate (PET) as the core polymer. Bico fibers of this type are useful materials in the preparation of nonwoven webs for filtration media. The bico fibers can be readily obtained as staple fibers having sufficient crimp and spin finish to be processed in a carding operation. In general the lower melting polymer of the bico fibers allows thermal bonding to take place to add strength and integrity to the web. The bico fibers may also be combined with one or more fibers selection from polyethylene fibers, polypropylene fibers and polyester fibers.

In one embodiment, the chemical treatment is used in a manner similar to a spin finish to the fibers before carding. The components of the chemical treatment may include, but is not limited to, an alkoxylated silicone copolymer and/or at least one antistatic agent. A suitable alkoxylated silicone copolymer may be selected from one or more of an ethoxylated silicone copolymer, a propoxylated silicone copolymer, and an ethoxylated/propoxylated silicone copolymer, and alkyl esters or sulfate modified sodium or calcium salts thereof. The antistatic agent may be selected from one or more of a cationic antistatic agent ("cationic antistat"), an anionic antistat ("anionic antistat"), or a quaternary antistatic agent ("quat antistat"). A weight ratio of alkoxylated silicone copolymer to antistat may range from about 4:1 to about 19:1, such as from about 17:3 to about 9:1. The total weight of chemical treatment applied to the fibers or fibrous material may range from about 0.05 to about 0.5 wt. %, such as from about 0.1 wt. % to about 0. 5 wt. % or from about 0.15 wt. % to about 0.45 wt. % of the total weight of the fibers or fibrous material The chemical treatment may be applied to the fibers by the fiber manufacturer in a traditional manner of producing staple fiber for carding. Application of the chemical treatment may be performed in the melt spinning operation and is usually accomplished by a kiss roll or metered flow applicator, where an aqueous emulsion of the chemical mix is applied per unit weight of the fiber. The chemical mix may also be applied in the secondary processes of drawing, crimping and cutting during production of the staple fibers.

The addition of the chemical treatment is well controlled to allow sufficient processing of the staple bico fibers through the carding process. The add-on or weight percent finish is desirably in the range of from about 0.05 wt. % to about 0.5 wt. % of the total weight of the processed bico fibers. The amount of chemical treatment used is necessary to control the delicate balance of slip and stick necessary for fiber transfer within the moving rolls of the card, as well as the static level developed from the interactions of the fiber to moving metal parts during the carding process.

Chemical treatment may also be applied to a fibrous nonwoven media. The fibrous nonwoven media may be formed using a variety of additional methods that include, but are not limited to, traditional dry laid and wet laid methods of forming nonwovens and continuous filament forming methods such as in a spunbond process. The application of the chemical treatment will depend somewhat on the nonwoven forming method; however tradition methods similar to those used in applying chemical treatments to synthetic fibers or woven webs, knitted and other textile-like materials, as well nonwovens materials may be used. Such methods include, but are not limited to, dipping, kiss coating, foaming, spraying and other finishing type operations known to those skilled in the art. Chemical treatment is effective on the surface of the fibrous nonwoven filter media.

The fibrous nonwoven filter media composed of bico fibers is also capable of being scored, pleated or folded in order to form a pleated filter. The pleats of the filter can be formed by various conventional pleating operations that include, but are not limited to, bar, rotary, and star gear pleating operations.

In one embodiment, the fibrous nonwoven filter media comprised of the bico fibers with the chemical treatment described above may be used to manufacture supported, self-supported or flat-sheet (not pleated) air or HVAC filters with at least a minimum efficiency rating (MERV) of MERV6 according to ASHRAE 52.2.

The following examples are illustrative of exemplary embodiments of the disclosure. In these examples as well as elsewhere in this application, all parts and percentages are by weight unless otherwise indicated. It is intended that these examples are being presented for the purpose of illustration only and are not intended to limit the scope of the invention disclosed herein. Chemical formulation details giving the range of chemicals involved in the manufacturing of each of these chemical treatments in the following examples are shown in Table 1.

TABLE 1

| Chemical Treatment | Chemical Formulation Details |
|---|---|
| A | Ethoxylated (1 mole to 300 moles)/Propoxylated (1 mole to 230 moles) $C_4$ to $C_{18}$ branched or linear alcohol |
| B | Ethoxylated (2 moles to 15 moles) $C_8$ to $C_{18}$ acid |
| C | ($C_4$ to $C_{18}$ branched or linear) alcohol phosphate neutralized (potassium or amine [monoethanol, diethanol, or triethanol]) |
| D | $C_8$ to $C_{18}$ amine ethoxylated (2 moles to 30 moles) sulfated quaternary (diethyl or dimethyl) |
| E | ethoxylated (1 mole to 300 moles)/propoxylated (1 mole to 230 moles) $C_4$ to $C_{18}$ branched or linear alcohol, $C_8$ to $C_{18}$ amine ethoxylated (2 moles to 30 moles) sulfated quaternary (diethyl or dimethyl), cyclic phosphate ester |
| F | silicone copolymer (1 to 300 repeating units) modified with ethoxylation (1 mole to 400 moles) and/or propoxylation (1 mole to 350 moles) acetate ester (0% to 100% capped), alcohols ($C_8$ to $C_{18}$ branched or linear) $C_2$ to $C_6$ diacid ester sulfate modified salt (sodium or calcium) |
| G | ($C_4$ to $C_{18}$ branched or linear) alcohol phosphate neutralized (potassium or amine [monoethanol, diethanol, or triethanol]), alcohols ($C_8$ to $C_{18}$ branched or linear) $C_2$ to $C_6$ diacid ester sulfate modified salt (sodium or calcium) |
| H | ethoxylated (2 moles to 40 moles) sorbitan esters, ethoxylated (2 moles to 50 moles) glyercides |
| I | Ethyl-N-hexadecylmorpholinium ethosulfate |

EXAMPLE 1

A fibrous nonwoven filter media at 90 grams per square yard (gsy) composed of 100 wt. %, 4-dpf bico fibers of PP/PET (sheath/core) identified in Table 2 as Sample 1, was formed using a carding process and bonded using thermal energy to provide strength to the nonwoven.

The fibrous nonwoven filter media identified in Table 2 as Sample 1 was soaked in a hot water bath (≤120 deg F for a minimum of 3 min) then soaking was repeated at least 3 times, each time with fresh water to remove the water soluble finish applied by the fiber manufacturer. The media was allowed to dry overnight. The foregoing technique known as the Wash Method was used to produce chemical/finish free fibrous nonwoven filter media as a starting media for the application of other chemical treatments and is listed in Table 2 as Sample 2.

In order to study the effect of other chemical treatments on the fibrous nonwoven filter media, numerous pieces of the nonwoven described above (Sample 1), were treated using the wash method to remove the finish supplied by the fiber producer to obtain a "base" nonwoven (Sample 2 in Table 2). Various chemical treatments noted in Table 2 were then applied to this "base filter media nonwoven" via an air brush spray unit and allowed to dry overnight. The chemically treated flat-sheets were then tested using ASHRAE 52.2 for their filtration efficiency performance.

The spray technique of adding the chemical treatment was not critical as long as the amount of chemical add-on could be measured. The spray technique was used to mimic one method of chemical application used in commercial processing. The add-on is determined by a weight difference in the media before and after spraying.

TABLE 2

| Sample Number | Chemical Treatment | Wt % Add-On | E3 Efficiency | % Improvement in E3 (over base) |
|---|---|---|---|---|
| 1 | PP/PET-nonwoven produced with unknown spin finish supplied by fiber manufacturer | 0.3 | 69 | 35.3 |
| 2 | (sample 1 above with spin finish removed via wash method) Base media at 90 gsy | 0 | 51 | Base |
| 3 | A | 0.2 | 58 | 13.7 |
| 4 | B | 0.2 | 59 | 15.7 |
| 5 | C | 0.1 | 60 | 17.6 |
| 6 | D | 0.1 | 65 | 27.5 |
| 7 | E | 0.3 | 64 | 25.5 |
| 8 | F | 0.4 | 75 | 47.1 |

As shown in Table 2, a fibrous nonwoven flat-sheet prepared from Sample 1 media had an E3 efficiency rating of 69. The E3 value indicated that the filter media met at least a MERV6 filtration efficiency, where 3.0-10.0 micron particles are removed at greater than or equal to 35% to less than 70%.

The finish free (washed) media identified in Table 2 as sample 2 was tested using ASHRAE 52.2. The E3 efficiency rating dropped to 51 as compared to the "unwashed" sample of 69 noting that the spin finish applied by the fiber manufacturer had some beneficial effect on filtration efficiency.

Samples 3 and 4 had chemical treatments A & B applied respectively using a spray technique. The chemical treatments were applied individually to the base nonwoven at 0.2 wt. % add-on. The E3 efficiency rating of Samples 3 and 4 according to the ASHRAE 52.2 test were 58 and 59 respectively. Accordingly, changing the viscosity of the treatment made little difference in the E3 efficiency rating of the media.

As shown in Table 2, a chemical treatment C was sprayed onto the base nonwoven at a 0.1 wt. % add-on to provide Sample 5. Sample 5 had an E3 efficiency ratio of 60. Treatment C is an example of anionic antistat.

Sample 6 in Table 2 was prepared by spraying 0.1 wt. % of treatment D a Quat antistat onto the base. This wt. % add-on resulted in an efficiency of 65 when tested using ASHRAE 52.2.

Since chemical spin finishes typically include a complex mixture of several components such as a lubricant, an antistatic agent and an emulsifier, it was important to understand the effect of the combination of these materials on filtration efficiency. Sample 7 (Table 2) comprises chemical treatment E a lubricant combined with an antistat that was applied as a spray to the base media (90 gsy) at a level of 0.3 wt. %. The E3 efficiency rating of Sample 7 was 64 from the ASHRAE 52.2 testing.

Sample 8 (Table 2) utilizes a chemical treatment F at 0.4 wt. % add-on. The nonwoven media of Sample 9 had an E3 efficiency rating of 75 which was a 47% increase in E3 rating over the base nonwoven media (Sample 2).

EXAMPLE 2

A second nonwoven media for testing was made by carding 100 wt. %, 2-dpf bicomponent fibers of PE/PET to produce a 52 gsy nonwoven media. The wash method, described above, was used on the media to remove the chemical finish applied by the fiber manufacturer to create a new base media as Sample 9 in Table 3. All of the samples in Table 3 including the base media of Sample 9 and the indicated treatments were tested according to ASHRAE 52.5.

TABLE 3

| Sample Number | Chemical Treatment | Wt % Add-On | E3 Efficiency | % Improvement in E3 (over base) |
|---|---|---|---|---|
| 9 | Base media 52 gsy | 0 | 75 | Not Applicable |
| 10 | F | 0.3 | 94 | 25.3 |
| 11 | (90/10) wt. ratio F/D | 0.3 | 94 | 25.3 |
| 12 | H | 0.3 | 92 | 22.7 |
| 13 | (85/15) wt. ratio F/C | 0.3 | 96 | 28.0 |

As shown in Table 3, Sample 9, the base media had an E3 efficiency rating of 75.

Sample 10 (Table 3) was the base media of Sample 9 that was treated with 0.3 wt. % of chemical treatment F using a spray application method. Sample 10 had an E3 efficiency rating of 94 which was a 25.3% increase in E3 efficiency over the base (Sample 9).

The base media was treated with a chemical formulation that included 90 wt. % chemical treatment F/10 wt. % chemical treatment D to produce Sample 11. The formulation was applied at a 0.3 wt. % add-on via the spray method. Sample 11 had an E3 efficiency rating of 94 which was comparable to the E3 rating of Sample 10. Thus the antistat (Chemical treatment D) provided little or no additional improvement in the E3 efficiency rating of the media.

Sample 12 (Table 3) was the base media with chemical treatment H that was applied to the media at an add-on of 0.3 wt. % via the air spray method. Sample 12 had an E3 efficiency rating of 92 when tested using ASHRAE 52.2. The E3 rating of Sample 12 compared favorably to the E3 rating of Samples 10 an 11.

Sample 13 was the base media treated with 85/15 weight ratio of chemical treatments F/C to provide a 0.3 wt. % add-on. Sample 13 had an E3 efficiency rating of 96.

EXAMPLE 3

A third nonwoven web was produced by carding followed by thermal bonding to give a web that measured at 78 gsy. The fibers used were a 2-dpf bicomponent of PE/PET. After several hot water rinses to remove the spin finish applied by the fiber supplier (Wash Method) followed by a 24 hours air drying, the sample was tested using ASHRAE 52.2 to give an E3 efficiency rating of the base media of 72 (Sample 14). Table 4, shows examples of increasing the concentration of various chemical treatments and their effect on the E3 efficiency rating of the media after testing according to ASHRAE 52.2.

TABLE 4

| Sample | Chemical Treatment | Wt % Add-On (based upon actives) | E3 Efficiency | % Improvement in E3 (over base) |
|---|---|---|---|---|
| 14 | Base 78 gsy | 0 | 72 | Not Applicable |
| 15 | (90/10) wt. ratio F/D | 0.15 | 87 | 20.3 |
| 16 | (90/10) wt. ratio F/D | 0.3 | 90 | 25.0 |
| 17 | (90/10) wt. ratio F/D | 0.45 | 93 | 29.2 |
| 18 | H | 0.15 | 82 | 13.9 |
| 19 | H | 0.3 | 84 | 16.7 |
| 20 | H | 0.45 | 86 | 19.4 |
| 21 | (85/15) wt. ratio F/C | 0.15 | 88 | 22.2 |
| 22 | (85/15) wt. ratio F/C | 0.3 | 89 | 23.6 |
| 23 | (85/15) wt. ratio F/C | 0.45 | 91 | 26.4 |

Samples 15, 16 and 17 showed that increasing add-on amounts (0.15 wt. % to 0.3 wt. %) applied via air spraying to the base Sample 14, a 90/10 weight ratio of chemical treatments F/D, increased the E3 efficiency ratings from 87 to 90 to 93 respectively.

Samples 18, 19 and 20 were base samples treated with chemical treatment H with increasing add-on concentrations (0.15 wt. % to 0.3 wt. % to 0.45 wt. %). The E3 efficiency ratings of Samples 18, 19 and 20 were 82, 84 and 86 respectively when tested using ASHRAE 52.2. These efficiency ratings are lower than those obtained from the 90/10 wt ratio of treatments F/D, (Samples 15-17, Table 4).

Samples 21, 22 and 23 were base samples treated with increasing amount (0.15 to 0.45 wt. %) of a 90/10 weight ratio of chemical treatments F/C. Samples 21, 22 and 23 showed a similar increase in E3 efficiency ratings with increasing amounts of treatment when tested using ASHRAE 52.2. The samples in Table 4 showed that the chemical formulation concentration also had an effect on the E3 efficiency rating values.

Accordingly, the chemical formulations in each of the above examples may be used as a spin finish that also functions as a process aid in carding. Optimum application (add-on) during fiber spinning is typically based upon optimum run-ability during carding. The formulation typically must have sufficient lubrication to aid in reducing fiber-to-metal friction, add cohesion to assist in fiber-to-fiber cohesion and eliminate static.

EXAMPLE 5

The Samples of Table 5 also provided examples of using certain chemicals as a fiber finish where a bicomponent staple fiber producer applied the chemical treatment to a 5-dpf PE/PET bicomponent fiber at a level of 0.3 wt. % add on. Sample 24 was the base nonwoven at 105 gsy that has been stripped of finish using the wash method described above.

TABLE 5

| Sample Number | Chemical Treatment | Wt % Add-On (based upon actives) | E3 Efficiency | % Improvement in E3 (over base) |
|---|---|---|---|---|
| 24 | Base 105 gsy | 0 | 70 | Not Applicable |

TABLE 5-continued

| Sample Number | Chemical Treatment | Wt % Add-On (based upon actives) | E3 Efficiency | % Improvement in E3 (over base) |
|---|---|---|---|---|
| 25 | (90/10) wt. ratio F/I | 0.3 | 89 | 36.9 |
| 26 | (85/15) wt. ratio F/G | 0.3 | 90 | 38.5 |

Sample 25 was a 106 gsy nonwoven produced from a carded process that was thermally bonded using the 5-dpf PE/PET staple fibers containing 0.3 wt. % of a chemical treatment that included 90 wt. %/10 wt. % of chemical treatments F/I. The nonwoven media of Sample 25 was tested according to ASHRAE 52.2 and provided an E3 efficiency rating value of 89. Good processing was noted in carding Sample 25 fiber. No problems were noted with static build-up, cohesion or fiber feeding or clumping.

A 104 gsy nonwoven media (Sample 26) was produced by carding followed by thermal bonding of a 5-dpf PE/PET bicomponent fiber containing a chemical formulation at 0.3 wt. % add-on supplied by Goulston Technologies, Inc. The chemical formulation listed for Sample 26 in Table 5 included 85 wt. %/15 wt. % of chemical treatments F/G. The chemical formulation was added to the PE/PET bico fibers during the staple fiber manufacturing process. Sample 26 had an E3 efficiency rating of 90 when tested according to ASHRAE 52.2.

One will note that the E3 efficiencies of Samples 25 and 26 in Table 5 were very high for essentially the same nonwoven media. The chemical treatments of Samples 25 and 26 also provided no processing problems during the carding process; noting no static, good lubrication and good fiber cohesion at carding line speeds greater than 120 feet per minute.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A method for improving air filtration efficiency of a fibrous media comprising
   applying to fibrous material at least about 0.05 wt. % based on a total weight of the fibrous material of chemical treatment comprising an alkoxylated silicone copolymer to provide in improvement in an E3 filtration efficiency value as tested according to ASHRAE 52.2 of about 20% or more compared to an E3 filtration efficiency value of fibrous material devoid of any chemical treatment;
   wherein the alkoxylated silicone copolymer comprises at least about 80 wt. % of the total amount of chemical treatment applied to the fibrous material.

2. The method of claim 1, wherein the fibrous material comprises fibers selected from the group consisting polyethylene fibers, polypropylene fibers, polyester fibers and bicomponent fibers and blends thereof.

3. The method of claim 1, wherein the fibrous material comprises bicomponent fibers selected from the group of polypropylene/polyethylene terephthalate fibers and polyethylene/polyethylene terephthalate fibers.

4. The method of claims 3, wherein the bicomponent fibers have a cross-section of sheath/core or side-by-side fibers.

5. The method of claim 1, further comprising forming filter media from the treated fibrous material using a dry laid nonwoven process.

6. The method of claim 1, wherein the chemical treatment is applied to the fibrous material by a process selected from the group consisting of spraying the fibrous material with the chemical treatment, dipping the fibrous material in a vessel containing the chemical treatment, and applying the chemical treatment as foam to the fibrous material.

7. The method of claim 2, wherein an add on weight of chemical treatment ranges from about 0.1 to about 0.5 wt. % based on a total weight of the fibers.

8. The method of claim 1, further comprising forming filter media from the chemically treated fibrous material using a wet laid nonwoven process.

9. The method of claim 8, wherein the chemical treatment is applied to the fibrous material by a process selected from the group consisting of spraying the fibrous material with the chemical treatment, dipping the fibrous material in a vessel containing the chemical treatment, and applying the chemical treatment as foam to the fibrous material.

10. The method of claim 1, wherein the chemical treatment further comprises an antistatic agent selected from the group consisting of a cationic antistatic agent, anionic antistatic agent and a non-ionic antistatic agent.

11. The method of claim 1, wherein an antistatic agent comprise at least about 10 wt. % of the total amount of chemical treatment applied to the fibrous material.

12. The method of claim 1, wherein the chemical treatment is applied to the fibrous material as a staple fiber finish.

13. The method of claim 1, wherein the chemical treatment is applied to the fibrous material as a spin finish to fibers of the fibrous material and the spin finish assists in a carding operation for the fibrous material.

14. Filtration media made by the method of claim 1, wherein the filter media meets at least a Minimum Efficiency Rating Value (MERV) of MERV6 as tested by ASHRAE 52.2.

15. A fibrous non-woven air filtration media comprising fibrous material comprising from about 0.1 to about 0.5 wt. % based on a total weight of the fibrous material of a chemical treatment comprising an alkoxylated silicone copolymer, whereby the non-woven air filtration media has an improvement in an E3 filtration efficiency value as tested according to ASHRAE 52.2 of about 20% or more compared to an E3 filtration efficiency value of fibrous material devoid of any chemical treatment;

wherein the alkoxylated silicone copolymer comprises at least about 80 wt. % of the total amount of chemical treatment applied to the fibrous material.

16. The filtration media of claim 15, wherein the filtration media is supported or is self-supporting.

17. The filtration media of claim 15, wherein the fibrous material is chemically treated prior to forming the fibrous non-woven air filtration media.

\* \* \* \* \*